(12) United States Patent
Fujimori

(10) Patent No.: US 7,756,941 B2
(45) Date of Patent: Jul. 13, 2010

(54) COMMUNICATION SYSTEM HAVING DOMINATING NODE AND DOMINATED NODE

(75) Inventor: Junichi Fujimori, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1148 days.

(21) Appl. No.: 10/177,832

(22) Filed: Jun. 20, 2002

(65) Prior Publication Data
US 2003/0018819 A1 Jan. 23, 2003

(30) Foreign Application Priority Data
Jul. 23, 2001 (JP) ............................. 2001-220895

(51) Int. Cl.
*G06F 15/16* (2006.01)
(52) U.S. Cl. .................................................... 709/208
(58) Field of Classification Search ......... 709/204–207, 709/230–237, 227–229, 246–247, 201–203, 709/213–216, 208
See application file for complete search history.

(56) References Cited

U.S. PATENT DOCUMENTS

| | | | | |
|---|---|---|---|---|
| 5,825,752 | A * | 10/1998 | Fujimori et al. | 370/260 |
| 5,938,752 | A * | 8/1999 | Leung et al. | 710/106 |
| 6,047,127 | A * | 4/2000 | McCarten et al. | 717/173 |
| 6,237,049 | B1 * | 5/2001 | Ludtke | 710/8 |
| 6,442,599 | B1 * | 8/2002 | DuLac et al. | 709/217 |
| 6,567,845 | B1 * | 5/2003 | Chatani | 709/208 |
| 6,910,086 | B1 * | 6/2005 | Inoue et al. | 710/110 |
| 2001/0005874 | A1 | 6/2001 | Domon | |
| 2001/0007118 | A1 * | 7/2001 | Matsuda | 710/129 |
| 2002/0078161 | A1 * | 6/2002 | Cheng | 709/208 |
| 2002/0085088 | A1 * | 7/2002 | Eubanks | 348/22 |
| 2002/0162010 | A1 * | 10/2002 | Allen et al. | 713/200 |
| 2005/0188132 | A1 * | 8/2005 | Takaku et al. | 710/62 |

FOREIGN PATENT DOCUMENTS

| | | |
|---|---|---|
| EP | 0932103 A1 | 1/1998 |
| EP | 1113624 A1 | 5/2000 |
| EP | 1061707 A2 | 6/2000 |
| EP | 1061707 A2 | 12/2000 |

(Continued)

OTHER PUBLICATIONS

Audio and Musical Protocol, Yamaha Corporation, Aug. 1966.

(Continued)

*Primary Examiner*—Shawki S Ismail
*Assistant Examiner*—Christopher Biagini
(74) *Attorney, Agent, or Firm*—Morrison & Foerster LLP

(57) ABSTRACT

A communication system comprises: a dominated node comprising a lower layer having a communication device that transmits/receives a signal to/from another node connected to a network, a notifying device that notifies said another node that the dominated node does not have an upper layer when the communication device receives a signal to an upper layer, and a processor that executes a process in accordance with the received signal corresponding to the lower layer; and a dominating node comprising a lower layer having a communication device that transmits/receives a signal to/from another node connected to the network, a first upper layer that manages the lower layer, and a second upper layer that manages the lower layer of the dominated node connected to the network.

19 Claims, 8 Drawing Sheets

FOREIGN PATENT DOCUMENTS

| | | |
|---|---|---|
| EP | 1113624 A1 | 7/2001 |
| JP | 11-163912 | 6/1999 |
| JP | 2001-053766 | 2/2001 |
| JP | 2001-167515 | 6/2001 |
| JP | 2001-186157 | 7/2001 |

OTHER PUBLICATIONS

Mlan's Promise: Audio & Midi Down the Same Wire, Wiffen, Paul, Keyboard, Miller Freeman Publications, San Francisco, US, Feb. 2001.

Die anwendernahen Schichten im ISO/OSI-Modell, Brill, Mandred, Elektronik, Mar. 4, 1988.

The Layered Approach: The OSI Model, Data and Computer Communications, 1991.

The Layered Approach: The OSI Model. Data and Communications, 1991, pp. 446-456, XP-000917810.

Audio and Music Protocol, Yamaha Corporation, Aug. 1, 1996.

Die anwendernahen Schichten im ISO/OSI-Modell, Manfred Brill, Mar. 4, 1988.

Mishina, Takashi, Field Network Interface <TPC-161> For FA Controller μ-GPCH, JEMA, 7 pages, Jan. 18, 1995.

Japanese Office Action dated Oct. 14, 2008, referencing JP2006-196109.

Partial Translation of JP Office Action mailed Oct. 14, 2008 for JP Patent Application No. 2006-196109.

* cited by examiner

COMMUNICATION SYSTEM HAVING DOMINATING NODE AND DOMINATED NODE

CROSS REFERENCE TO RELATED APPLICATION

This application is based on Japanese Patent Application No. 2001-220895, filed on Jul. 23, 2001, the entire contents of which are incorporated herein by reference.

BACKGROUND OF THE INVENTION

A) Field of the Invention

The present invention relates to a communication system having dominating nodes and dominated nodes, and more particularly to a dominating node capable of managing other nodes and a dominated node to be dominated by the dominating node.

B) Description of the Related Art

IEEE1394 is known as the standards of a serial interface capable of large capacity high speed data transfer. An interface complied with the IEEE1394 standards and an apparatus having this interface (hereinafter collectively called an IEEE1394 device) constitute one node having hardware IEEE1394 bus protocols (lower layer) and software protocols (upper layer) for device control, isochronous transmission control and the like.

FIG. 9 is a conceptual diagram showing an example of a protocol stack of a general audio visual (AV) apparatus having an mLAN (trademark) upper layer. The mLAN standards are complied with the IEEE1394 standards and are an application at a higher level than the IEEE1394 standards, constituting a digital network system for music.

The lower layer is constituted of, for example, a physical layer, a link layer, a transaction layer, and a serial bus management layer.

The physical layer defines physical and electrical interfaces. The physical layer is generally made of hardware.

The link layer provides one-way transmission service called sub-action and packet transmission/reception service (packet handler). Similar to the physical layer, the link layer is also generally made of hardware. The link layer provides, for example, synchronous transmission and isochronous transmission services.

Isochronous transmission is used for signals requiring high speed processing such as audio signals and video signals. The link layer of hardware provides all services of the isochronous transmission.

The transaction layer deals with synchronous transmission. The transaction is a data transmission of a request-response type. There are three transaction types, a read transaction, a write transaction and a lock transaction.

The read transaction is used for reading data from a specific target address space. The write transaction is used for writing data in a specific target address space. The lock transaction is used for renewing data in a specific target address space in accordance with reference data.

The serial bus management layer is a module for concentrically managing resources on the bus. The bus management includes management of power supplies, management of a topology map and a speed map, management of isochronous resources, and the like.

The upper layer is software for managing the lower layer and the whole node, and is constituted of, for example, the 1394AV protocols (IEC-61883) and mLAN upper layer.

The 1394AV protocols define a common isochronous packet (CIP) format for expressing the data contents of an isochronous packet, a connection management protocol (CMP) for managing connections by defining a virtual "plug", a function control protocol (FCP) for managing other devices connected to the IEEE1394 bus, and the like.

The mLAN upper layer is a protocol layer for transmission of audio/music information in accordance with the IEEE1394 standards. The mLAN upper layer is constituted of an audio/music information transmission protocol and a connection management protocol both complied with the 1394AV protocols.

The audio/music information transmission protocol is used for adding the format for transmitting audio/music information to the definition of CIP. The connection management protocol is used for performing autonomous connection management of each node by using an intelligent CMP.

All IEEE1394 devices connected to an IEEE1394 bus have the upper and lower layers although the functions thereof are different more or less.

The upper layer is more complicated than the lower layer. Therefore, hardware resources necessary for the upper layer increase more than the lower layer. The manufacture cost rises if the upper layer is used for all IEEE1394 devices.

The upper layer is more relevant to a user interface than the lower layer. There are, therefore, many chances of feeding back revision requests from users. Although it is desired that the upper layer has the structure easy to match a new specification, the manufacture cost rises if the structure of the upper layer of each of all IEEE1394 devices is made easy to upgrade.

SUMMARY OF THE INVENTION

An object of this invention is to provide an apparatus complied with the IEEE1394 standards and capable of being manufactured at a low cost.

Another object of this invention is to provide an apparatus complied with the IEEE1394 standards and capable of managing other nodes.

According to one aspect of the present invention, there is provided a communication apparatus constituting one node, comprising: a lower layer having communication device that transmits/receives a signal to/from another node connected to a network; a first upper layer that manages the lower layer; and a second upper layer that manages a lower layer of a specific dominated node connected to the network.

According to another aspect of the invention, there is provided a communication apparatus constituting one node, comprising: a lower layer having a communication device that transmits/receives a signal to/from another node connected to a network; and a notifying device that notifies said another node that the communication apparatus does not have an upper layer when the communication device receives a signal to an upper layer.

According to a further aspect of the present invention, there is provided a communication system, comprising: a dominated node comprising a lower layer having a communication device that transmits/receives a signal to/from another node connected to a network, a notifying device that notifies said another node that the dominated node does not have an upper layer when the communication device receives a signal to an upper layer, and a processor that executes a process in accordance with the received signal corresponding to the lower layer; and a dominating node comprising a lower layer having a communication device that transmits/receives a signal to/from another node connected to the network, a first upper layer that manages the lower layer, and a second upper layer that manages the lower layer of the dominated node connected to the network.

It is possible to provide an apparatus complied with the IEEE1394 standards and capable of being manufactured at a low cost.

It is also possible to provide an apparatus complied with the IEEE1394 standards and capable of managing other nodes.

BRIEF DESCRIPTION OF THE DRAWINGS

FIG. 5 is a block diagram illustrating communications between the general node 2a and dominated node 3a.

DESCRIPTION OF THE PREFERRED EMBODIMENTS

Figure 1:
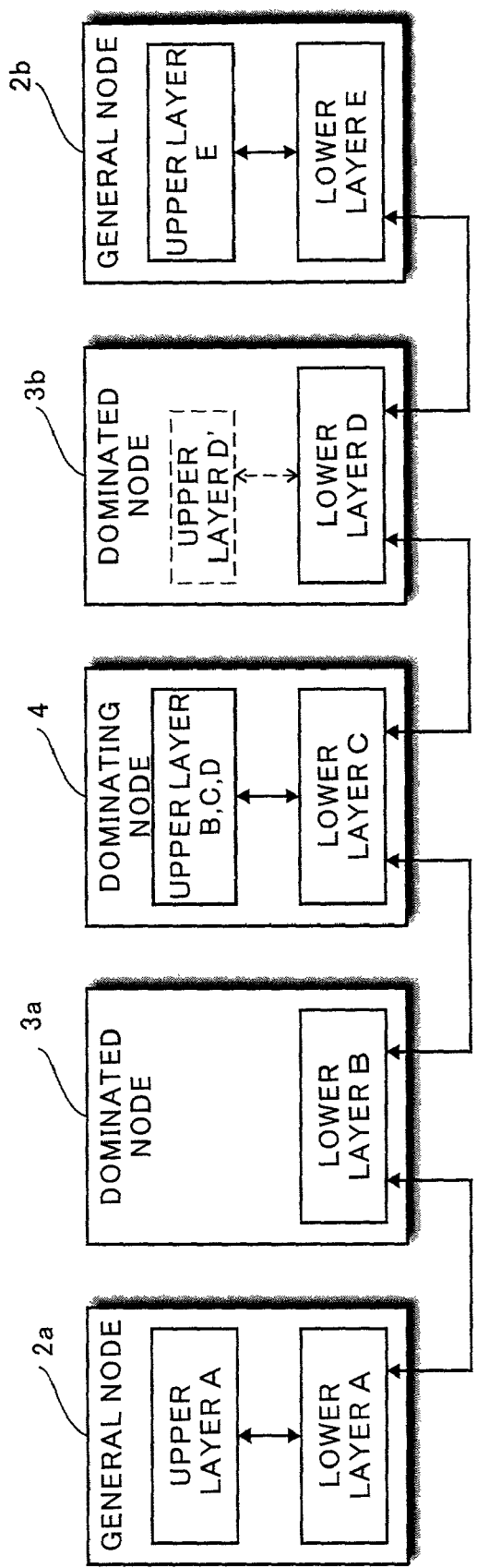
FIG. 1 is a block diagram showing an example of an IEEE1394 bus 1 according to an embodiment of the invention.

FIG. 1 is a block diagram showing an example of an IEEE1394 bus 1 according to an embodiment of the invention.

The IEEE1394 bus 1 of the embodiment is structured by connecting, with IEEE1394 cables, general nodes 2a and 2b with their upper and lower layers, a dominated node 3a without an upper layer, and a dominating node 4 with its upper and lower layers and upper layers of other nodes (e.g., upper layers of the dominated nodes 3a and 3b).

Each of the general nodes 2a and 2b may be one of an electronic musical instrument, an acoustic machine, an AV apparatus, a personal computer, an external storage device of various types and the like each having an IEEE1394 interface. The general node 2a has the upper layer A and lower layer A, and the general node 2b has the upper layer E and lower layer E.

The dominated node 3a may be one of an electronic musical instrument, an acoustic machine, an AV apparatus, a personal computer, an external storage device of various types and the like each having an IEEE1394 interface. For example, the dominated node 3a may be a powered speaker or the like. The dominated node 3a has no upper layer, but it is provided with only the lower layer B. Since the dominated node 3a does not have an upper layer, the dominated node 3a itself cannot normally communicate with the general node 2a or 2b by using a protocol defined by the upper layer.

Since the dominated node 3a is not provided with the upper layer, it cannot process by itself a command based upon the 1394AV protocol and a command based upon the mLAN standards which commands are generally processed by the upper layer. Since various transactions, isochronous transmission and the like are processed by the lower layer, the dominated node 3a itself can process them.

For example, if the dominated node 3a is a powered speaker, voice signals and the like to be reproduced are generally transmitted through isochronous transmission so that they can be processed only by the lower layer. However, connection setting of a reception channel, volume control and the like cannot be processed by the dominated node 3a itself with only the lower layer, because a command is received by the upper layer and the upper layer writes data in a function register in the lower layer corresponding to the command by analyzing the command.

The dominated node 3a is a terminal node and stores an ID for identifying the type of an upper layer necessary for the dominating node that dominates the dominated node into a Control and Status Registers (CSR) memory to be described later. The dominated node 3a also stores a Global Unique Identifier (GUID) of the dominating node currently dominating the terminal node in the CSR memory.

The dominating node 4 may be one of an electronic musical instrument, an acoustic machine, an AV apparatus, a personal computer, an external storage device of various types and the like each having an IEEE1394 interface. For example, the dominating node 4 is a personal computer having an external storage device. The dominating node 4 has its lower layer C and upper layer C and in addition to the upper layers B and D for managing the lower layers of the dominated nodes 3a and 3b. These upper layers B and D are used as the proxies of the upper layers of the dominated nodes 3a and 3b so that the dominated node 3a or 3b can communicate with the general node 2a or 2b by using the protocol defined by the upper layer.

The dominating node 4 stores a GUID of a dominated node that the dominating node can dominate, in correspondence with software (upper layer) for managing the dominated node.

The structure of the dominated node 3b is approximately the same as that of the dominated node 3a, excepting that the dominated node 3b has an upper layer D' and the lower layer D. The dominated node 3b may suspend the function of its upper layer D' to be managed by the upper layer D of the dominating node 4. The upper layer D' of the dominated node 3b may manage only some functions and missing functions may be managed by the upper layer D of the dominating node 4. Functions of the upper layer D' of the dominated node 3b can be executed or suspended in response to an external command.

Similar to the dominated node 3a, the dominated node 3b is a terminal node and stores an ID for identifying the type of an upper layer in the CSR memory, ID being necessary for the dominating node that manages the dominated node. If functions of the upper layer D' of the dominated node 3b are to be suspended, the dominated node 3b stores a GUID of the dominating node currently managing the dominated node in the CSR memory.

Figure 2:
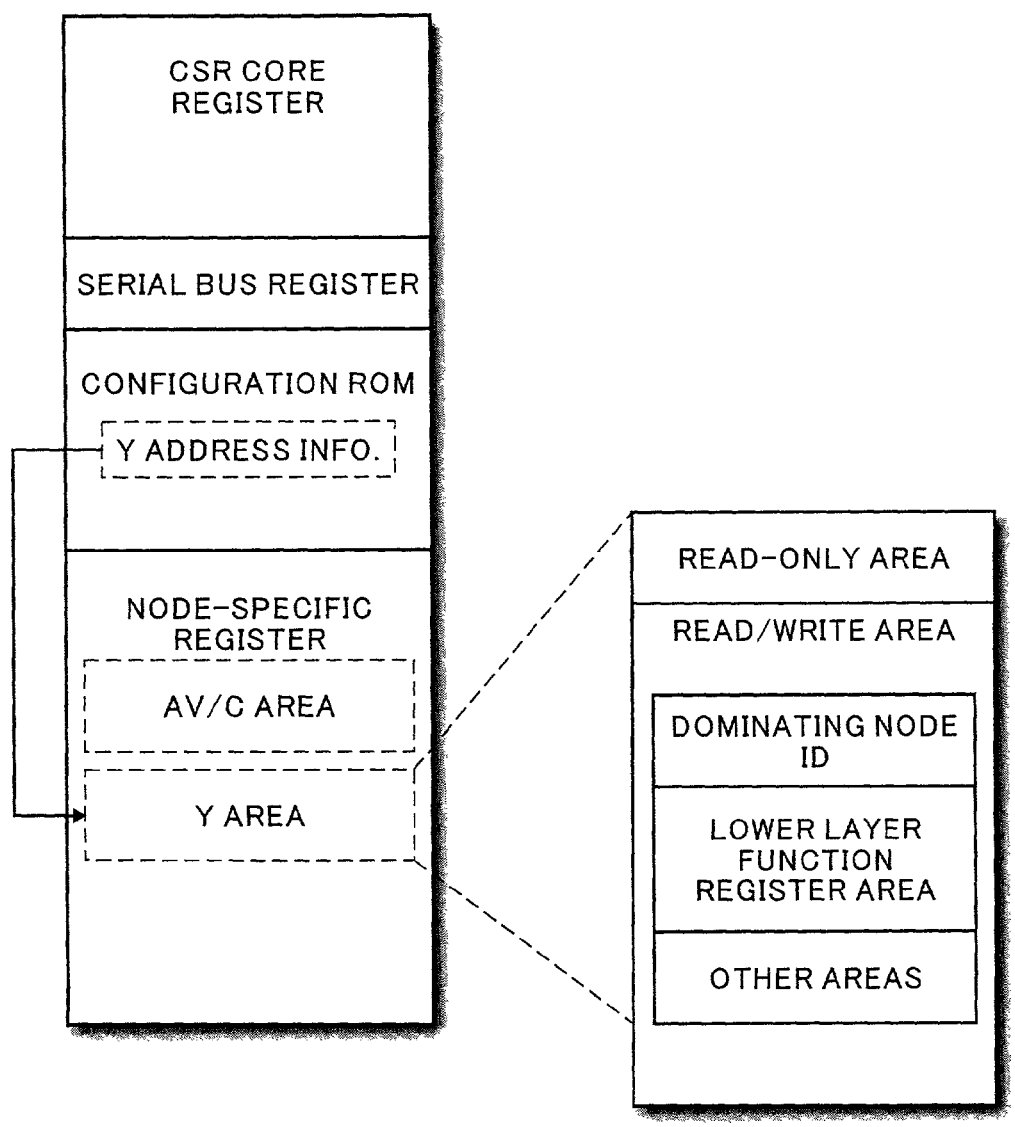
FIG. 2 is a conceptual diagram showing an example of a CSR memory of a dominated node 3a or 3b according to the embodiment.

FIG. 2 is a conceptual diagram showing an example of the CSR memory of the dominated node 3a or 3b according to the embodiment.

The CSR memory of the dominated node 3a or 3b is constituted of, for example, a CSR core register, a serial bus register, a configuration-ROM having Y address information, and node-specific registers having an AV/C area and a Y area.

The CSR core register and serial bus register have the structure similar to that of a known IEEE1394 device.

The Y address information is made public to other nodes (particularly the dominating node). The Y address information includes the addresses of a read-only area and a read/write area respectively in the Y area, and the addresses of a dominating node ID, a lower layer function register area and other areas respectively in the read/write area.

A GUID of the dominating node managing the dominated node is stored in the dominating node ID.

A node (dominating node) whose GUID is stored in the dominating node ID reads this Y address information so that the dominating node can detect the addressees of registers necessary for managing the dominated node.

Only a node whose GUID is stored in the dominating node ID may be permitted to write data in a node-specific register. In this case, even if dominating nodes whose GUID's are not written in the dominating ID exist on the same bus, contention between the dominating nodes can be prohibited.

Figure 3:
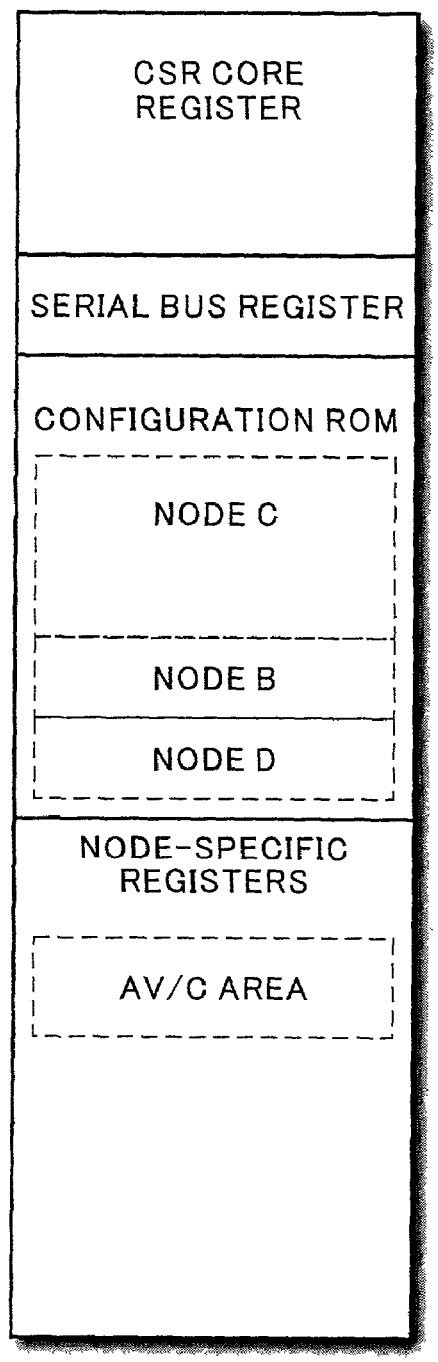
FIG. 3 is a conceptual diagram showing an example of a CSR memory of a dominating node 4 according to the embodiment.

FIG. 3 is a conceptual diagram showing an example of the CSR memory of the dominating node 4 according to the embodiment.

The CSR memory of the dominating node 4 is constituted of, for example, a CSR core register, a serial bus register, a configuration-ROM, and node-specific registers having an AV/C area.

The CSR core register and serial bus register have the structure similar to that of a known IEEE1394 device. The structure of other parts is generally the same as that of the CSR memory of the dominated node 3a or 3b shown in FIG. 2.

The CSR memory of the dominating node 4 features in that it stores information of the dominating node in the configuration-ROM as well as function information of dominated nodes under management of the dominating node. Since the function information of each dominated node under management is stored in the configuration-ROM, the other node connected to the network interprets as if the dominating node features the functions of the dominated node.

Figure 4:
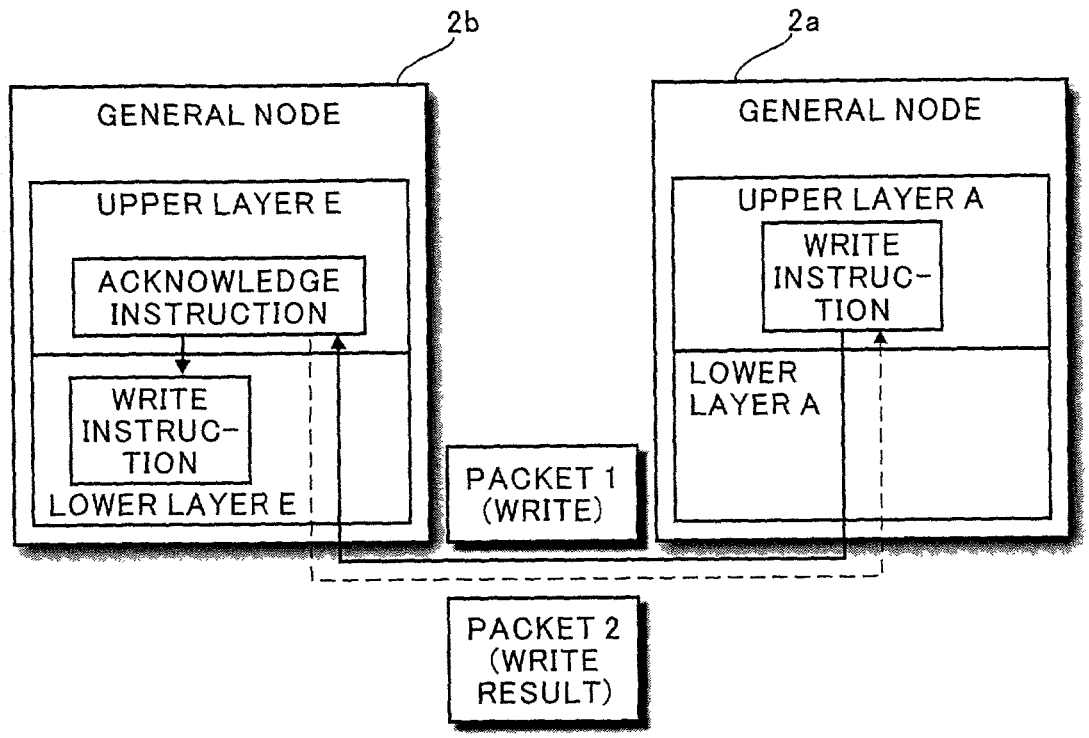
FIG. 4 is a block diagram illustrating communications between general nodes 2a and 2b.

FIG. 4 is a block diagram illustrating communications between the general nodes 2a and 2b.

First, the general node 2b receives from the general node 2a (on the transmission side) a write-command instruction (packet 1) relative to an address corresponding to a function of the upper layer E. Next, in accordance with this write instruction, the lower layer E of the general node 2b (on the reception side) executes the write-command relative to the address corresponding to the function of the upper layer E.

Thereafter, the upper layer E of the general node 2b acknowledges the write instruction (packet 1) and supplies the lower layer E with the write instruction relative to a register (function register) corresponding to the command. Namely, the upper layer E analyzes the received command to allow control data corresponding to the contents of the command to be written in the register (function register) of the lower layer E corresponding to the function to be managed by the command. With the above-described operations, the lower layer E can perform the operation corresponding to the command transmitted from the general node 2a, in accordance with the control data written in the register.

After the control data is normally written, the lower layer E of the general node 2b transmits a packet 2 to the general node 2a, the packet 2 indicating that the write instruction was executed normally.

The nodes having the upper layer can manage each other by writing data in the function register via their own upper layers.

Figure 5:
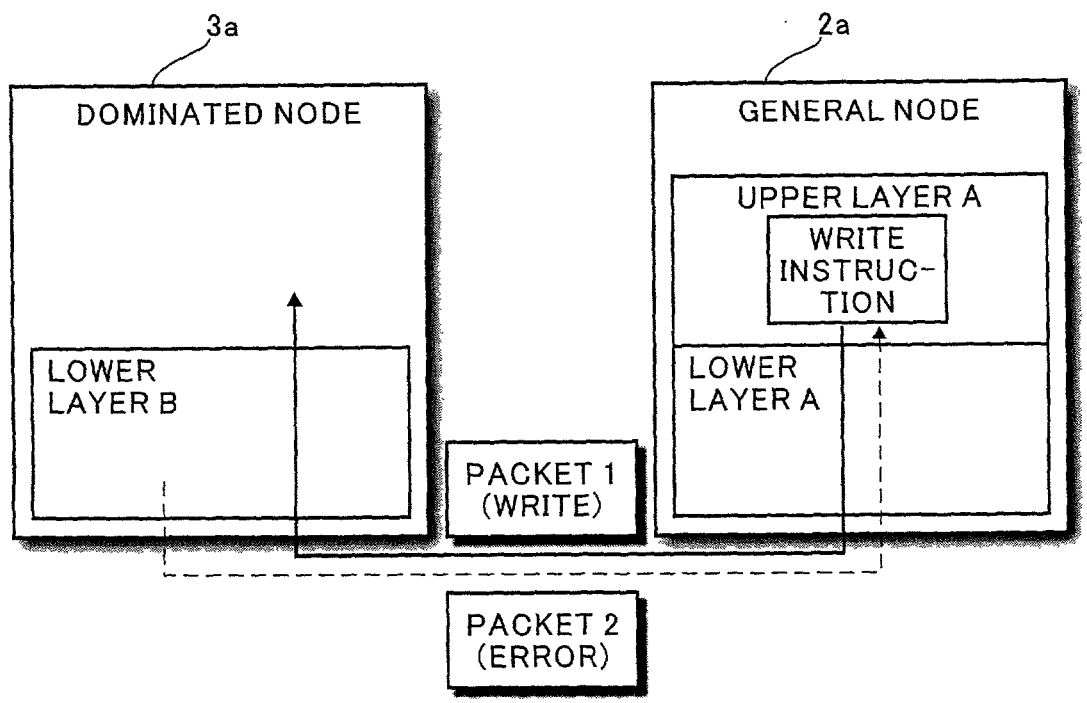

FIG. 5 is a block diagram illustrating communications between the general node 2a and dominated node 3a according to the embodiment. In this example, it is assumed that the dominating node 4 is not connected to the IEEE1394 bus 1.

The dominated node 3a receives, from the general node 2a (on the transmission side), a write-command instruction (packet 1) relative to the address corresponding to a function of the upper layer. In accordance with this write instruction, the lower layer B of the dominated node 3a (on the reception side) tries to execute the write-command. However, since the dominated node 3a is not provided with the upper layer, the address corresponding to the function of the upper layer does not exist. Therefore, the lower layer B transmits an error (packet 2) to the general node 2a. Namely, since the dominated node 3a is not provided with the upper layer, the write-command corresponding to the received packet 1 fails so that the control of the lower layer B corresponding to the command will not be performed.

Since the dominated node 3a returns the error relative to the command corresponding to the function of the upper layer, it can know that the dominated node 3a is not provided with the upper layer.

Figure 6:
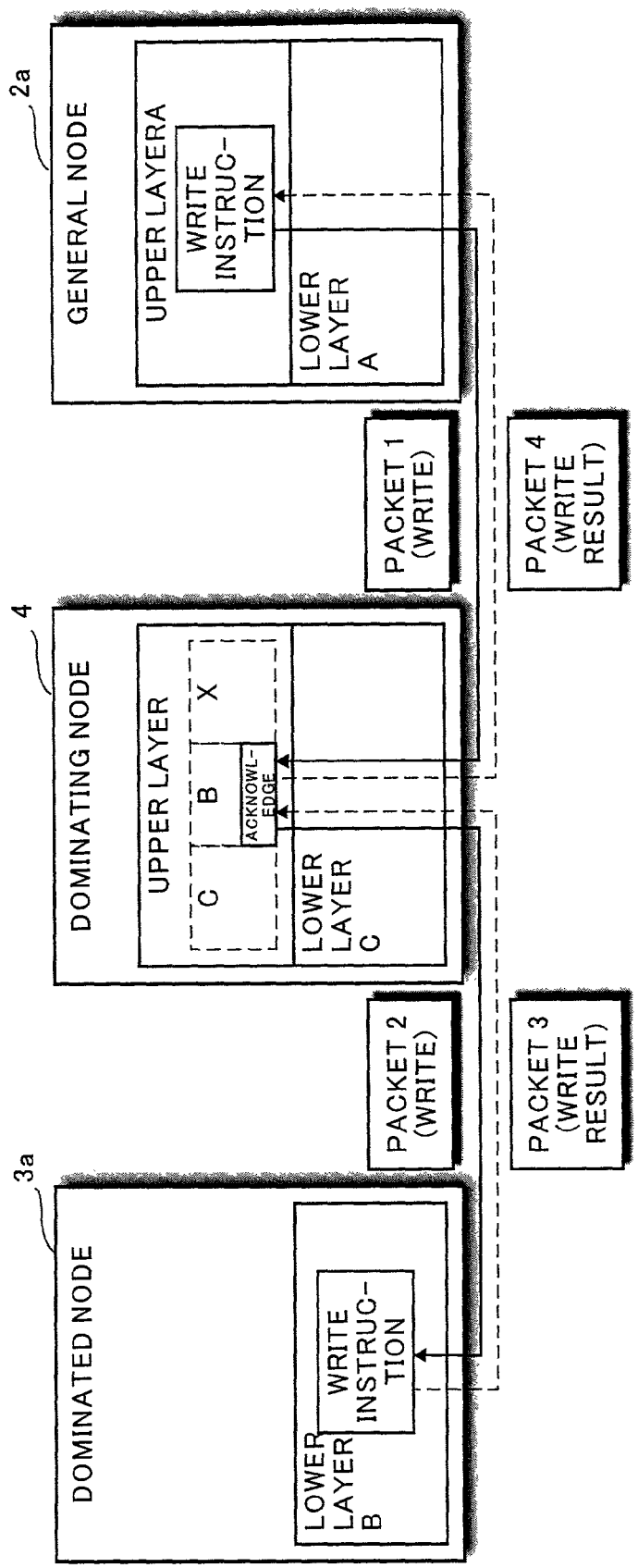
FIG. 6 is a block diagram illustrating communications between the general node 2a and dominated node 3a via the dominating node 4 according to the embodiment.

In this embodiment, as shown in FIG. 6, the dominating node 4 is provided with the upper layer of the dominated node 3a and communicates with the general node 2a as a proxy of the dominated node 3a.

FIG. 6 is a block diagram showing communications between the general node 2a and dominated node 3a via the dominating node 4 according to the embodiment. The dominating node 4 can manage the dominated node 3a because the dominating node 4 has already been set by a dominated node management setting process to be later described.

First, the lower layer C of the dominating node 4 receives from the general node 2a (on the requesting side) a write-command instruction (packet 1) relative to an address corresponding to a function of the upper layer B of the dominated node 3a.

Next, in accordance with the received write instruction, the lower layer C of the dominating node 4 writes a command relative to the address corresponding to the function of the upper layer B. Thereafter, the upper layer B detects the address of a function register of the lower layer B of the dominated node 3a corresponding to the function designated by the command. A write instruction (packet 2) for control data corresponding to the command relative to the detected address is transmitted to the dominated node 3a.

Thereafter, the lower layer B of the dominated node 3a executes the received write instruction (packet 2). Namely, the control data is written relative to the address corresponding to the function register of the lower layer B, and the process result (packet 3) is transmitted to the dominating node 4. In accordance with the written control data, the lower layer B executes an operation corresponding to the command transmitted from the general node 2a to the upper layer B of the dominating node 4.

Upon reception of the process result (packet 3) from the dominated node 3a, the dominating node transmits a response (packet 4) to the command to the general node 2a that is the requesting side and sent the command.

The general node 2a receives the response (packet 4) from the dominating node 4 and recognizes that the process was performed normally.

The dominating node 4 becomes a proxy of the role that the upper layer of a dominated node originally plays. A signal to be processed at the upper layer is transmitted to the dominated node by using the format that the lower layer can process. In this manner, a write-command or the like relative to the dominated node without the upper layer can be performed.

Figure 7:
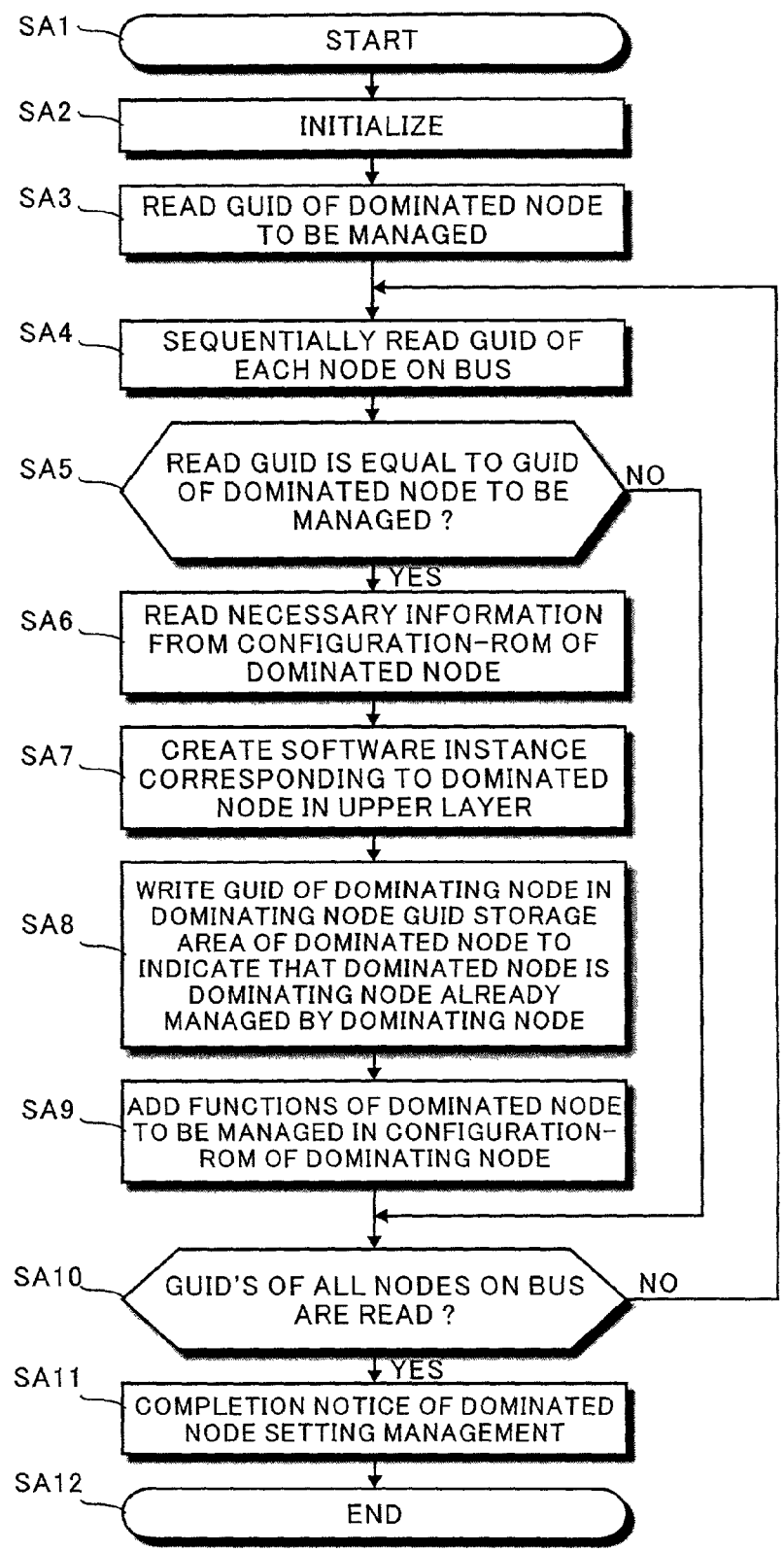
FIG. 7 is a flow chart illustrating a management setting process for dominated nodes to be executed by the dominating node 4 according to the embodiment.

FIG. 7 is a flow chart illustrating a dominated node management setting process to be executed by the dominating node 4. This dominated node management setting process is activated each time a normal bus reset is executed. The bus reset occurs when the topology changes such as when a new node is connected to the bus and when the connected node is disconnected from the bus.

At Step SA1, the dominated node management setting process starts and the flow advances to the next Step SA2.

At Step SA2, the dominated node management setting process is initialized. For example, the functions and the like of each dominated node described in the configuration-ROM of the dominating node are cleared. Thereafter, the flow advances to the next Step SA3.

At Step SA3, GUID of each dominated node to be managed is read from a rewritable memory (e.g., the read/write area in FIG. 2). For the convenience of following description, it is assumed that the dominating node of this embodiment has already memorized one GUID of a dominated node in the rewritable memory. In a practical case, the dominating node may memorize one GUID, a plurality of GUID's or no GUID of the dominated node(s).

GUID of the dominated node to be managed may be input by a user. GUID of the dominated node, which received the write instruction relative to the address corresponding to the function of the upper layer and returned the error as shown in FIG. 5, may be read from the configuration-ROM of the dominated node. After GUID of the dominated node to be managed is read, the flow advances to the next Step SA4.

At Step SA4, GUID of each node connected to the IEEE1394 bus 1 is read. Although only one GUID is read by this Step SA4, GUID's of all nodes are will be read by repeating Step SA4. Thereafter, the flow advances to the next Step SA5.

At Step SA5, it is checked whether GUID read at Step SA3 of the dominated node to be managed is equal to GUID read at Step SA4. If equal, the flow advances to Step SA6 indicated by a YES arrow, whereas if not, the flow skips to Step SA10 indicated by a NO arrow.

At Step SA6, information necessary for managing the dominated node having the same GUID as that read at Step SA4 is read from the configuration-ROM of the dominated node. Thereafter, the flow advances to the next Step SA7.

At Step SA7, in accordance with the information read at Step SA6, a software instance (an upper layer of the dominated node to be managed) corresponding to the dominated node is created in the upper layer of the dominating node. Thereafter, the flow advances to the next Step SA8.

Creating the software instance corresponding to the dominated node is to set the state of the dominating node so as to allow the upper node of the dominating node to acknowledge the command (such as an AV/C command) which the upper layer of the dominated node should originally acknowledge. Namely, after this process at Step SA7, the dominating node can acknowledge a command transmitted from another node to the dominated node under management of the dominating node.

At Step SA8, GUID of the dominating node is written in the dominating node GUID storage area (FIG. 2) of the dominated node to indicate that the dominated node is managed by this dominating node. Thereafter, the flow advances to the next Step SA9.

By writing GUID of the dominating node in the dominated node to be managed, another dominating node can be notified of that the dominated node is already managed.

At Step SA9, information of functions of the dominated node is additionally written in the configuration-ROM of the dominating node. It is therefore possible that another node can see transparently as if the dominating node has functions of the dominated node. Thereafter, the flow advances to the next Step SA10.

Functions corresponding to the upper layer of a dominated node to be managed (the upper layer of a dominated node connected to the bus) among the upper layers prepared in advance by the dominating node are written in the configuration-ROM of the dominating node, but functions corresponding of the upper layer of a dominated node not to be managed (the upper layer of a dominated node not connected to the bus) are not written in the configuration-ROM.

At Step SA10, it is checked whether GUID's of all nodes connected to the IEEE1394 bus 1 are read. If read, the flow advances to Step SA11 indicated by a YES arrow, whereas if not, the flow returns to Step SA4 indicated by a NO arrow to repeat the succeeding Steps.

At Step SA11, a completion notice of dominated node management setting is issued to other nodes in order to make the other nodes recognize that the dominated node is already managed. Thereafter, the flow advances to the next Step SA12 whereat the dominated node management setting process is terminated.

In this manner, it becomes possible to recognize that the dominating node has functions of a dominated node. At Step SA11, a bus reset may be issued to make other nodes connected to the same IEEE1394 bus 1 as that of the dominating node recognize the software instance created in the upper layer of the dominating node. In this case, the other nodes can see transparently as if there is a dominated node 3a with the upper layer.

A command corresponding to a function of the upper layer of the dominated node to be managed is transmitted to the dominating node.

The lower layer can directly process transmissions based on isochronous communications so that a command is directly transmitted to a dominated node without involving the dominating node.

After the dominated node management setting process, the dominating node can process all accesses to the upper layer of a dominated node under management of the dominating node, and if necessary, can issue a predetermined transaction to a corresponding dominated node to confirm or change the operation state of the dominated node.

When a new dominated node is connected to the bus or when the connected dominated node is disconnected from the bus, the dominating node executes the process shown in FIG. 7 in response to the generated bus reset. In this case, functions of the new dominated node are written in the configuration-ROM of the dominating node, or functions of the disconnected dominated node are erased from the configuration-ROM.

Figure 8:
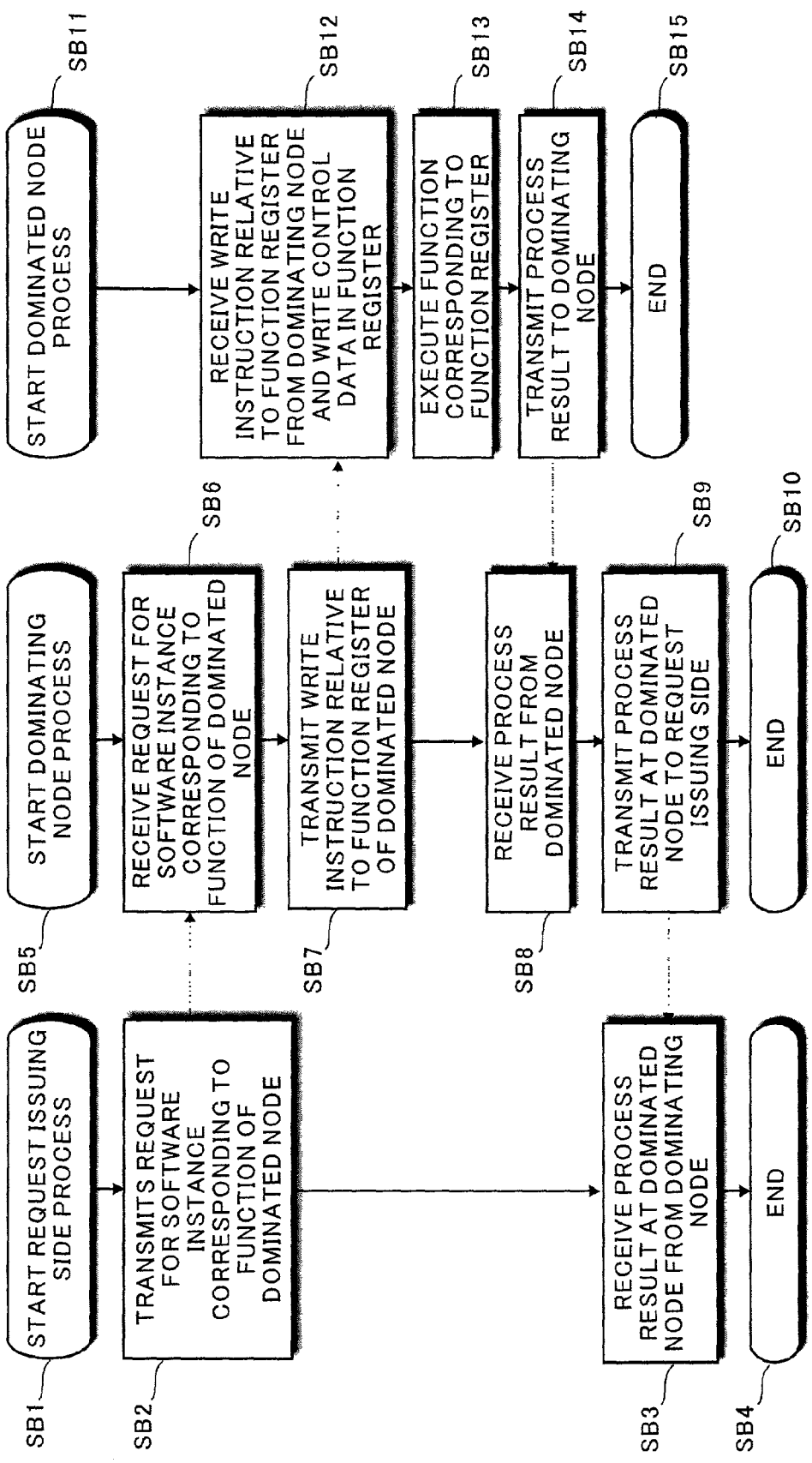
FIG. 8 is a flow chart illustrating a process of performing communications illustrated in FIG. 6 to be executed by each node.
Figure 9:
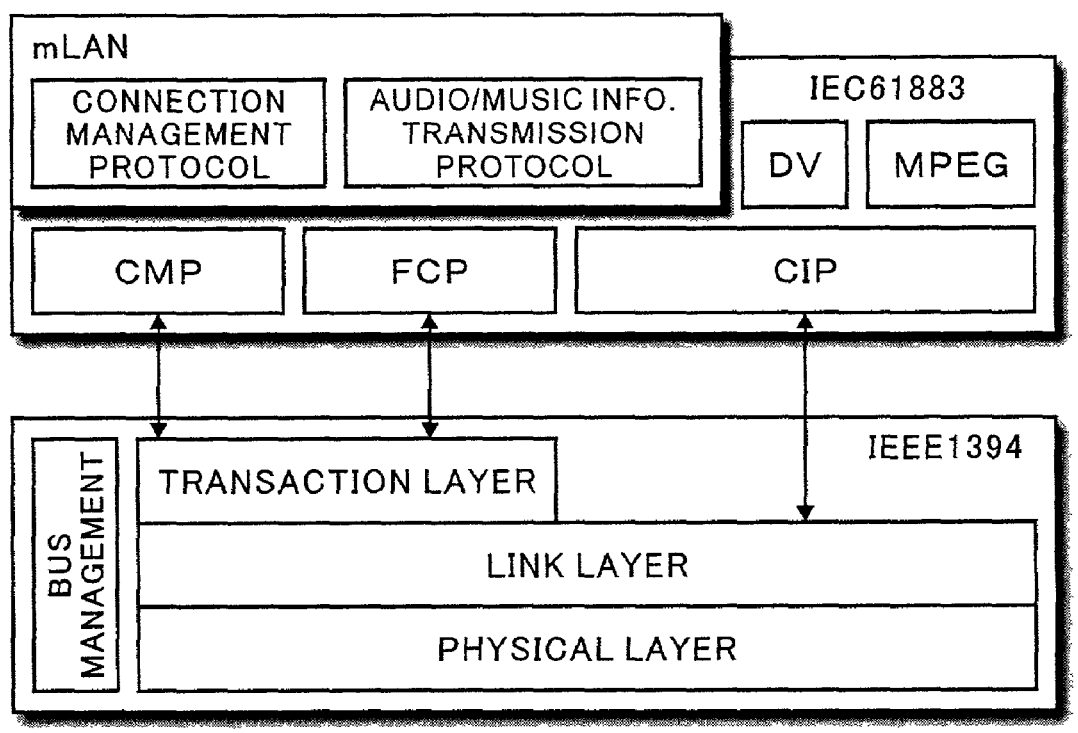
FIG. 9 is a conceptual diagram showing an example of a protocol stack of a general audio/visual (AV) apparatus having an mLAN upper layer.

FIG. 8 is a flow chart making easy to understand the concept of a process at each node during communications illustrated in FIG. 6. It is assumed that the dominating node has already executed the dominated node management setting process shown in FIG. 7. An arrow with a broken line shaft indicates a transmission of a packet.

Steps SB1 to SB4 are processes to be executed at a request issuing side (the general node 2a shown in FIG. 6).

At Step SB1, the request issuing side process starts and the flow advances to the next Step SB2.

At Step SB2, a request for a software instance (the upper layer B of the dominating node 4 shown in FIG. 6) corresponding to a function of the dominated node is transmitted.

Thereafter, the flow advances to the next Step SB3. The transmitted request is received by the dominating node at Step SB6 to be later described.

At Step SB3, the request issuing side receives a process result at the dominated node transmitted from the dominating node at Step SB9 to be described later. Thereafter, the flow advances to Step SB4 whereat the request issuing side process is terminated.

Steps SB5 to SB10 are processes to be executed at the dominating node (the dominating node 4 shown in FIG. 6).

At Step SB5, the dominating node process starts and the flow advances to the next Step SB6.

At Step SB6, the dominating node receives the request for the software instance (the upper layer B of the dominating node 4 shown in FIG. 6) corresponding to the function of the dominated node and created in the upper layer of the dominating node. Thereafter, the flow advances to the next Step SB7.

At Step SB7, a write instruction is transmitted to the function register of the dominated node. Thereafter, the flow advances the next Step SB8. As described earlier, the dominating node stores the functions of each dominated node managed by the dominating node in the configuration-ROM. The dominating node also stores a variety of pieces of information for controlling each dominated node in a working memory of the dominating node. This information includes information of functions of each dominated node, an address of the function register of each dominated node corresponding to each function, and the like. The transmitted write instruction is received by the dominated node at Step SB12 to be described later.

At Step SB8, the dominating node receives the process result at the dominated node transmitted at Step SB14 to be described later. Thereafter, the flow advances to the next Step SB9.

At Step SB9, the process result at the dominated node received at Step SB8 is transmitted to the request issuing side. Thereafter, the flow advances to the next Step SB10 to terminate the dominating node process.

Steps SB11 to SB15 are processes to be executed by the dominated node (the dominated node 3a shown in FIG. 6).

At Step SB11, the dominated node process starts and the flow advances to the next Step SB12.

At Step SB12, the dominated node receives the write instruction to the function register transmitted from the dominating node at Step SB7, and writes control data in the function register. Transmission/reception of the write instruction and a process based on the write instruction are performed by the transaction layer of the lower layer. Therefore, these operations can be performed normally by the dominated node without the upper layer. Thereafter, the flow advances to the next Step SB13.

At Step SB13, a function corresponding to the function register is executed. For example, predetermined values or the like are written in the function register. Thereafter, the flow advances to the next Step SB14.

At Step SB14, the process result of the write instruction is transmitted to the dominating node. Thereafter, the flow advances to the next Step SB15 to terminate the dominated node process.

According to the embodiment, an IEEE1394 device serving as a dominating node can manage an apparatus (dominated node) complied with the IEEE1394 standards and without the upper layer.

An IEEE1394 device corresponding to a general node can therefore control the dominated node via the dominating node.

A single dominating node can manage a plurality of dominated nodes. It is therefore easy to update the upper layer complied with the IEEE1394 standards such as a user interface, without updating each apparatus separately and independently. Updating includes not only "updating an upper level protocol" but also "fixing bugs" and "improving the performance".

Since the upper layer is implemented in the dominating node, a node without the upper layer can be realized while maintaining compatibility with the upper layer complied with the IEEE1394 standards.

Since the upper layer is omitted from the dominated node, hardware and software resources necessary for the upper layer can be omitted, and the dominated node can be manufactured at a low cost.

Even if some or all of the functions of the upper layer of a dominated node are suspended, the dominated node can be managed by the dominating node. In this case, updating the upper layer of the dominating node is equivalent to updating the upper layer of the dominated node.

Even if the upper layer is defined by new IEEE1394 standards, the dominated node can be made complied with the new IEEE1394 standards only by updating the upper layer of the dominating node.

If the dominating node is a personal computer or the like capable of executing a plurality of software pieces (upper layers) for managing dominated nodes, GUID of the dominated node managed by each software piece is managed and stored. In this manner, it becomes possible to avoid contention such as managing one dominated node by a plurality of software pieces.

In the above embodiment, although only one dominating node is connected to the IEEE1394 bus 1, a plurality of dominating nodes may be connected to the IEEE1394 bus 1. If a plurality of dominating nodes are connected to the same IEEE1394 bus, it is necessary to arrange in such a manner that dominated nodes managed by respective dominating nodes are not duplicated.

The functions of the embodiment may be realized by a commercially available computer installed with a computer program and the like realizing the embodiment functions.

In such a case, computer readable storage media such as a CD-ROM and a floppy disk storing the computer program and the like realizing the embodiment functions may be supplied to users.

If a computer is connected to a communication network such as a LAN, the Internet and telephone lines, the computer program and the like may be supplied via the communication network.

The present invention has been described in connection with the preferred embodiments. The invention is not limited only to the above embodiments. It is apparent that various modifications, improvements, combinations, and the like can be made by those skilled in the art.

I claim:

1. A communication apparatus operatively coupled to a single network having a defined network protocol and serving as a dominating node, said communication apparatus comprising: a layered structure specified by the network protocol, said layered structure including:

at least a first lower layer, said first lower layer having a first register and a communication section that communicates signals with another node and a specific dominated node that are each operatively coupled to the single network via said network protocol, said specific dominated node includes only a lower layer;

a first upper layer, said first upper layer manages the first lower layer, said first upper layer including:
a first generating device that generates the first control signal, and
a first writing device that writes the first control signal in the first register to control the operation of the first lower layer, wherein the operation of the first lower layer is controlled by a first control signal stored in the first register; and
a second upper layer, said second upper layer including:
a second generating device that generates a second control signal for controlling a lower layer of the specific dominated node, and
a second writing device that writes the second control signal to said second register of the lower layer of the specific dominated node via the network,
wherein said another node transmits, to the communication section of the first lower layer, a first instruction and a second instruction, said first and second instructions conform with an upper layer protocol of the network protocol of the single network,
wherein said first generating device generates said first control signal in accordance with the first instruction received from said another node,
wherein said second generating device generates said second control signal in accordance with the second instruction received from said another node, and
wherein the communication apparatus operate as a proxy of the specific dominated node.

2. A communication apparatus according to claim 1, further comprising:
a result receiving device that receives, from the specified dominated note, a process result of the writing to the second register; and
a response sending device that sends, to said another node, a response of the second instruction.

3. A communication apparatus according to claim 1, further comprising a first storing device that stores information about functions of the specific dominated node.

4. A communication apparatus according to claim 3, wherein the first storing device is accessible from said another node via the single network.

5. A communication apparatus according to claim 1, further comprising:
an identification storing device that stores information in correspondence with the second upper layer;
an identification reading device that reads identification information from each of the nodes connected to the network; and
a checking device that checks whether the identification information read is equal to the information stored,
wherein, if the identification information read from a certain one of said nodes by the identification reading device is equal to the information stored, then the certain one of said nodes corresponds to the specific dominated node, and the communication apparatus operates as proxy to the certain one of said nodes.

6. A communication apparatus according to claim 1, wherein the specific dominated node includes a second storing device that stores identification information of the communication apparatus.

7. A communication apparatus according to claim 6, further comprising an identification writing device that writes identification information of the communication apparatus to the second storing device of the specific dominated node.

8. A communication apparatus according to claim 1, wherein said defined network protocol is compliant with IEEE 1394 standard.

9. A communication apparatus according to claim 1, wherein said defined network protocol is compliant with mLAN standard.

10. A communication system comprising,
a second communication apparatus operatively coupled to a single network having a defined network protocol and serving as a dominated node, said second communication apparatus consisting of a single layered structure specified by the network protocol, said layered structure comprising:
a second lower layer having a second communication section that communicates signals with another node connected to the network,
a second register that stores a second control signal, and
a processor that processes signals received by the communication section; and
a first communication apparatus operatively coupled to the single network and serving as a dominating node having a layered structure specified by the network protocol, said first communication apparatus comprising:
a first lower layer having a first register, wherein the operation of the first lower layer is controlled by data stored in the first register,
a first upper layer that manages the first lower layer,
a second upper layer that manages the second lower layer of said second communication apparatus;
a first communication section in the first lower layer that communicates signal with another node and the second communication apparatus, wherein said another node generates a first instruction and a second instruction;
a first generating device included in the first upper layer for generating a first control signal in accordance with said first instruction received from said another node via the network,
a first writing device that writes the first control signal in the first register to control the operation of the first lower layer;
a second generating device included in the second upper layer that generates a second control signal for controlling the second lower layer of the second communication apparatus in accordance with the second instruction received from said another node, and
a second writing device that writes the second control signal to the second register,
wherein an operation of the second lower layer of the second communication apparatus is controlled by the second control signal stored in the second register,
wherein the first communication apparatus operates as a proxy of the second communication apparatus, and
wherein said second communication apparatus further comprises a notifying device that notifies said another node that said second communication apparatus is managed by said first communication apparatus.

11. A communication system according to claim 10, wherein said first communication apparatus further comprises:
a result receiving device that receives, from the second communication apparatus, a process result of the writing to the second register of the second communication apparatus; and
a response sending device that sends, to said another node, a response of the second instruction.

12. A communication system according to claim 10, wherein said first communication apparatus further comprises a first storing device that stores information about functions of the second communication apparatus.

13. A communication system according to claim 12, wherein the first storing device is accessible from said another node via the single network.

14. A communication system according to claim 10, wherein said first communication apparatus further comprises:
- an identification storing device that stores information in correspondence with the second upper layer;
- an identification reading device that reads identification information from each of the nodes connected to the network; and
- a checking device that checks whether or not the identification information read is equal to the information stored,
- wherein, if the identification information read from a certain one of said nodes by the identification reading device is equal to the information stored, then the certain one of said nodes corresponds to the second communication apparatus and the first communication apparatus operates as proxy to the certain one of said nodes.

15. A communication system according to claim 10, wherein the second communication apparatus includes a second storing device that stores identification information of the first communication apparatus.

16. A communication system according to claim 15, further comprising an identification writing device that writes identification information of the first communication apparatus to the second storing device of the second communication apparatus.

17. A communication system according to claim 10, wherein said defined network protocol is compliant with IEEE 1394 standard.

18. A communication system according to claim 10, wherein said defined network protocol is compliant with mLAN standard.

19. A communication apparatus operatively coupled to a single network having a defined network protocol and serving as a dominated node for communicating with a first node also operatively coupled to the single network and serving as a dominating node, said dominating node having a layered structure specified by the network protocol, said layered structure including a lower layer, a first upper layer for controlling the lower layer of the first node and a second upper layer, said communication apparatus comprising:
- a singled layer structure consisting a lower layer having a register therein, wherein the operation of the lower layer is controlled by data stored in the register; and
- a communication section that is included in the lower layer of said dominated node and communicates signals with another node and the first node;
- wherein said second upper layer generates a control signal in accordance with an instruction of a protocol defined by the upper layer of said first node and writes the control signal to the register in the lower layer of the communication apparatus via the lower layer of the first node and the single network, and
- wherein the communication apparatus is adapted to be controlled by said first node that operates as a proxy of the communication apparatus.

* * * * *